(12) United States Patent
Jung et al.

(10) Patent No.: US 9,355,408 B2
(45) Date of Patent: May 31, 2016

(54) ADVERTISING SERVICE METHOD USING DEVICE-TO-DEVICE COMMUNICATION AND APPARATUS FOR PERFORMING THE SAME

(71) Applicant: Electronics and Telecommunications Research Institute, Daejeon (KR)

(72) Inventors: Kwang Ryul Jung, Daejeon (KR); Hyeong Jun Park, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 46 days.

(21) Appl. No.: 14/077,864

(22) Filed: Nov. 12, 2013

(65) Prior Publication Data

US 2014/0304081 A1 Oct. 9, 2014

(30) Foreign Application Priority Data

Apr. 9, 2013 (KR) ........................ 10-2013-0038724

(51) Int. Cl.
*G06Q 30/00* (2012.01)
*G06Q 30/02* (2012.01)

(52) U.S. Cl.
CPC ................................. *G06Q 30/0267* (2013.01)

(58) Field of Classification Search
CPC ................................................ G06Q 30/0267
USPC ....................................................... 705/14.1
See application file for complete search history.

(56) References Cited

U.S. PATENT DOCUMENTS

| 2011/0055326 | A1 | 3/2011 | Michaelis et al. |
| 2012/0123866 | A1 | 5/2012 | Li et al. |
| 2014/0171062 | A1* | 6/2014 | Fallgren ................ H04W 40/22 455/422.1 |

FOREIGN PATENT DOCUMENTS

| KR | 1020100028696 | 3/2010 |
| WO | 2010/028690 A1 | 3/2010 |

* cited by examiner

*Primary Examiner* — Daniel Lastra
(74) *Attorney, Agent, or Firm* — Nelson Mullins Riley & Scarborough LLP

(57) ABSTRACT

Disclosed is an advertising service method using D2D communication for efficiently using limited radio resources and control channel resources. The advertising service method includes setting a D2D common bearer with a network, receiving advertising terminal information from at least one other advertising terminal through the D2D common bearer, registering the advertising terminal in the network, transmitting advertising information to the at least one other advertising terminal and a user terminal through the D2D common bearer, and setting a user terminal and a D2D dedicated bearer on the basis of information received from the network. Accordingly, an advertisement can be easily transmitted to a plurality of user terminals which were not previously connected, and a collision between advertising terminals which are located in plurality in a specific area and transmit advertisements can be avoided.

16 Claims, 10 Drawing Sheets

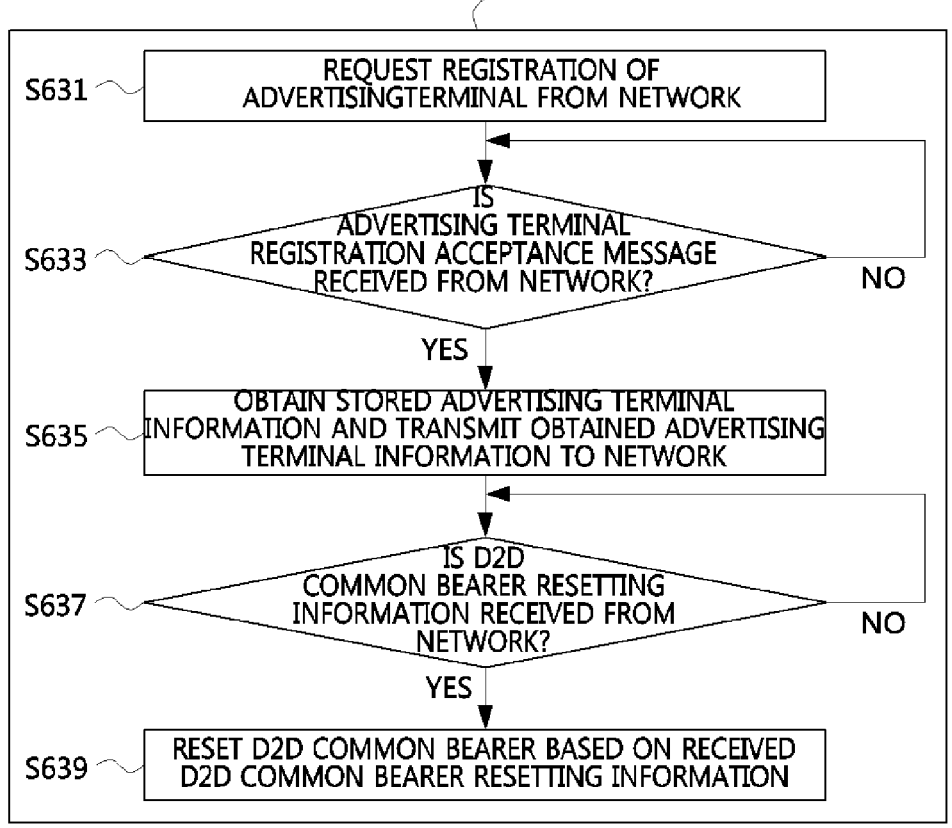
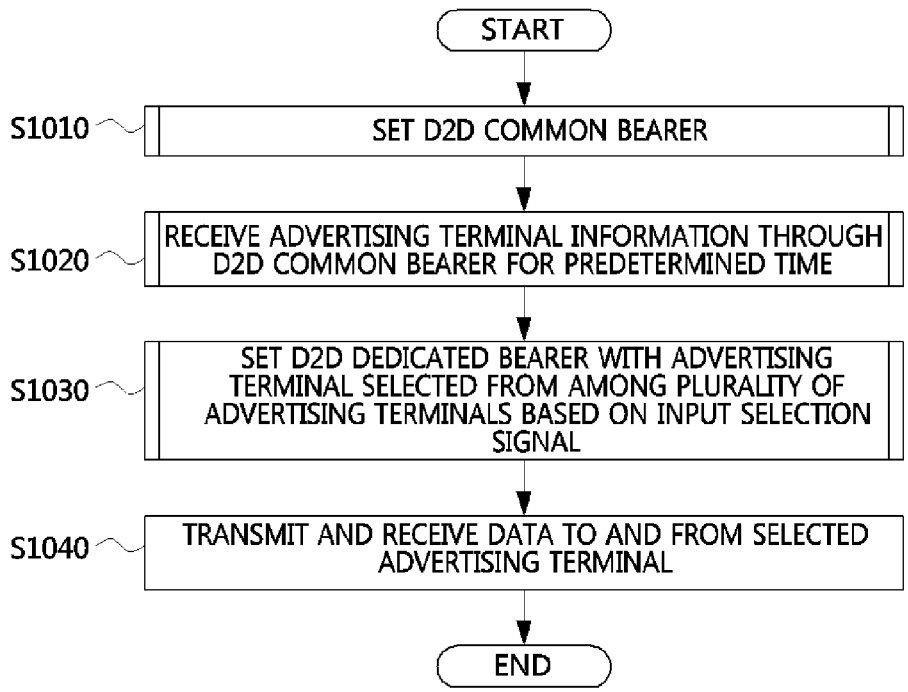

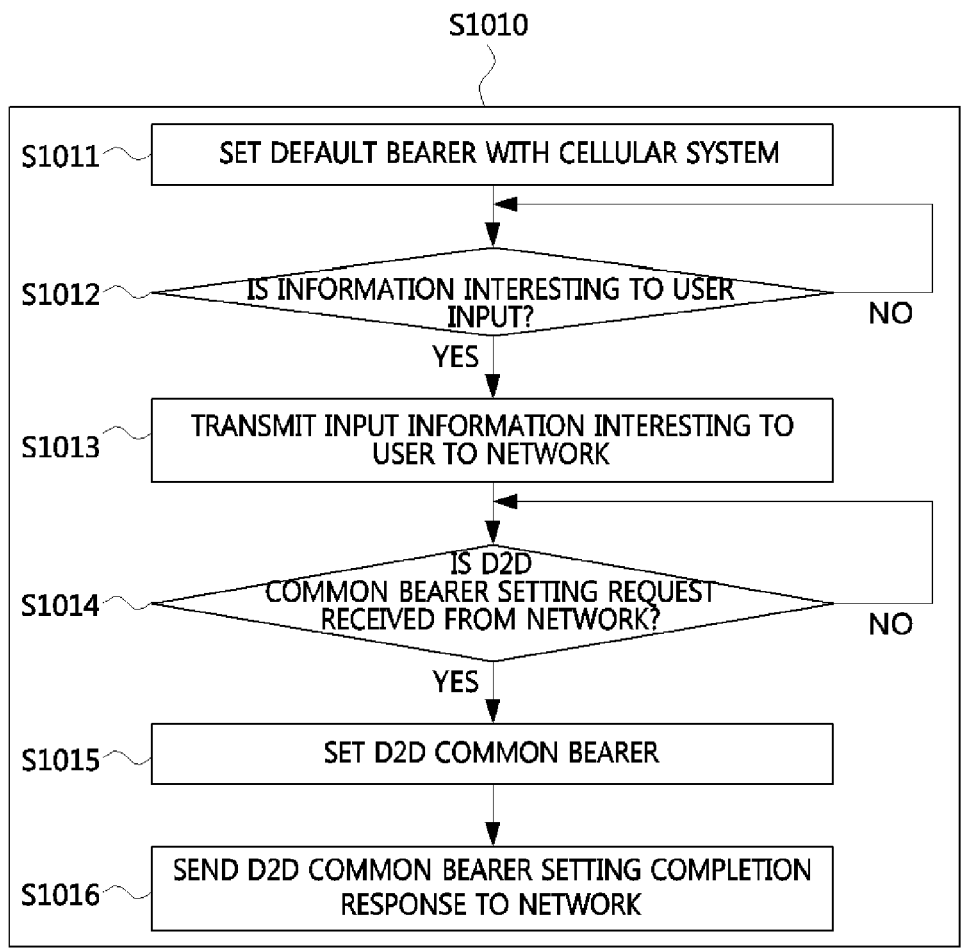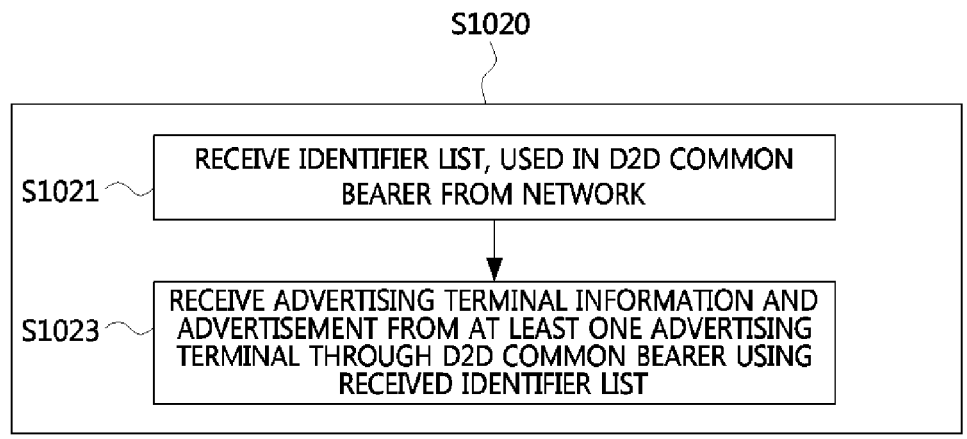

ADVERTISING SERVICE METHOD USING DEVICE-TO-DEVICE COMMUNICATION AND APPARATUS FOR PERFORMING THE SAME

CLAIM FOR PRIORITY

This application claims priority to Korean Patent Application No. 10-2013-0038724 filed on Apr. 9, 2013 in the Korean Intellectual Property Office (KIPO), the entire contents of which are hereby incorporated by reference.

BACKGROUND

1. Technical Field

Example embodiments of the present invention relate in general to device-to-device (D2D) communication and more specifically to an advertising service method using D2D communication for efficiently using limited radio resources and control channel resources and an apparatus for performing the advertising service method using D2D communication.

2. Related Art

Recently, as mobile communication devices with various new services installed therein, such as smartphones, tablet personal computers (PCs), etc., are rapidly provided, an amount of data traffic is rapidly increasing in a mobile communication network.

Moreover, when Internet of thing (IoT) such as communication between people and things and thing-to-thing communication, which is a new mobile market beyond person-to-person communication, is activated, traffic transmitted to a base station is expected to increase by the degree in which it is difficult for the base station to control at present.

Accordingly, D2D communication is recently considered as a scheme that can improve a performance of the existing mobile communication network at a low cost. The D2D communication is a communication scheme in which data is directly transmitted and received between two adjacent user terminals without passing through a base station, in which case the two user terminals become a source and destination of data and perform communication.

Here, the D2D communication uses cellular communication technology as is, and thus can support a higher security, a broader coverage, and a faster data transmission rate than conventional technologies such as Wi-Fi Direct, Zigbee, Bluetooth, etc.

Between proximity-based cellular communication and D2D communication, a procedure for direct communication between two user terminals knowing each other is considered like a call handover (service continuity) service and a service that helps find devices near a user, but a discovery and communication procedure for direct communication between two irrelevant user terminals (which are not previously set) are also considered to be important.

Furthermore, in order to transfer an advertisement to a number of unspecified nearby persons like a D2D advertising service, a method that minimizes a setting procedure between user terminals and transfers data based on proximity, and a scheme for efficiently using a control channel having a limited capacity should be also considered in a D2D communication scheme using cellular mobile communication which needs to allocate resources to a transmitting terminal and a receiving terminal respectively through a control channel.

Moreover, when a plurality of user terminals transmit advertising information in a specific area such as a department store, a shopping center, or the like, a simple and consistent procedure should be used until a user obtains interesting information, and it is required to efficiently manage resources used between user terminals which transmit an advertisement.

SUMMARY

Accordingly, example embodiments of the present invention are provided to substantially obviate one or more problems due to limitations and disadvantages of the related art.

Example embodiments of the present invention provide an advertising service method using D2D communication, which can efficiently use limited radio resources and control channel resources.

Example embodiments of the present invention also provide an apparatus for performing the advertising service method using D2D communication.

In some example embodiments, an advertising service method using device-to-device (D2D) communication, which is performed by an advertising terminal, includes: setting a D2D common bearer with a network; receiving advertising terminal information from at least one other advertising terminal through the D2D common bearer; registering the advertising terminal in the network; transmitting advertising information to the at least one other advertising terminal and a user terminal through the D2D common bearer; and setting a user terminal and a D2D dedicated bearer on the basis of information received from the network.

The setting of the network and D2D common bearer may include: setting a default bearer with the network; sending a message, indicating a D2D service activation state, to the network; setting the D2D common bearer corresponding to a D2D common bearer setting request message received from the network; and sending a D2D common bearer setting completion response message to the network.

The receiving of advertising terminal information from a plurality of advertising terminals through the D2D common bearer may include: receiving an identity information list using the D2D common bearer from the network; receiving advertising terminal information from other advertising terminal through the D2D common bearer using the received identity information list; and storing the received advertising terminal information.

The receiving of advertising terminal information from a plurality of advertising terminals through the D2D common bearer may be performed for a predetermined time on the basis of at least one of a density of other advertising terminals and a moving speed of the user terminal.

The advertising terminal information may include at least one of number of neighboring advertising terminals and identity information of the neighboring advertising terminals.

The registering of the advertising terminal in the network may include: sending a message for requesting a registration of the advertising terminal to the network; when an advertising terminal registration acceptance message is received from the network, transmitting the advertising terminal information to the network; and when D2D common bearer resetting information is received from the network, resetting a D2D common bearer on the basis of the received D2D common bearer resetting information.

The advertising terminal registration acceptance message may include peer identity information.

The transmitting of advertising information to other terminal through the D2D common bearer may include generating advertising information in a specific size on the basis of a time period and a resource which are allocated by the network, and transmitting the generated advertising information to other terminal through the D2D common bearer.

The information received from the network may include identity information of a user terminal intending to set the D2D dedicated bearer and setting information of the D2D dedicated bearer.

In other example embodiments, an advertising service method using D2D communication, which is performed by a user terminal, includes: setting a D2D common bearer with a network; receiving advertising terminal information from a plurality of advertising terminals through the D2D common bearer; setting a D2D dedicated bearer with an advertising terminal that has transmitted specific advertising terminal information among information of the plurality of advertising terminals; and transmitting and receiving data to and from an advertising terminal that has set the D2D dedicated bearer.

The receiving of the advertising terminal information from a plurality of advertising terminals through the D2D common bearer may be performed for a predetermined time on the basis of at least one of a density of neighboring advertising terminals and a moving speed of the user terminal.

The advertising terminal information may include at least one of number of neighboring advertising terminals and identity information of the neighboring advertising terminals.

The setting of the network and D2D common bearer may include: setting a default bearer with the network; transmitting input information interesting to a user to the network; when a D2D common bearer setting request message is received from the network, setting the D2D common bearer; and sending a D2D common bearer setting completion response message to the network.

The receiving of the advertising terminal information from a plurality of advertising terminals through the D2D common bearer may include: receiving an identity information list using the D2D common bearer from the network; and receiving advertising terminal information and advertisements from the plurality of advertising terminals through the D2D common bearer using the received identity information list.

The setting of the D2D dedicated bearer and the advertising terminal that has transmitted specific advertising terminal information among information of the plurality of advertising terminals may include: selecting specific advertising terminal information from among information of the plurality of advertising terminals on the basis of a user input; sending a D2D communication connection request message with an advertising terminal, which has transmitted the specific advertising terminal information, to the network; when identity information of the advertising terminal and setting information of a D2D dedicated bearer are received from the network, setting the D2D dedicated bearer on the basis of the received identity information of the advertising terminal and the setting information of the D2D dedicated bearer; and sending a D2D dedicated bearer setting completion response message to the network.

The D2D communication connection request message with the advertising terminal, which has transmitted the specific advertising terminal information, may include identity information of the advertising terminal and identity information of the user terminal.

BRIEF DESCRIPTION OF DRAWINGS

Example embodiments of the present invention will become more apparent by describing in detail example embodiments of the present invention with reference to the accompanying drawings, in which:

FIG. 9 is a flowchart specifically illustrating an advertising terminal registering operation in the advertising service method of FIG. 6;

FIG. 10 is a flowchart illustrating an advertising service method using D2D communication which is performed by a user terminal according to an embodiment of the present invention;

FIG. 11 is a flowchart specifically illustrating a common bearer setting operation in the advertising service method of FIG. 10;

FIG. 12 is a flowchart specifically illustrating an operation that receives advertising terminal information through a D2D common bearer in the advertising service method of FIG. 10.

DESCRIPTION OF EXAMPLE EMBODIMENTS

Figure 1:
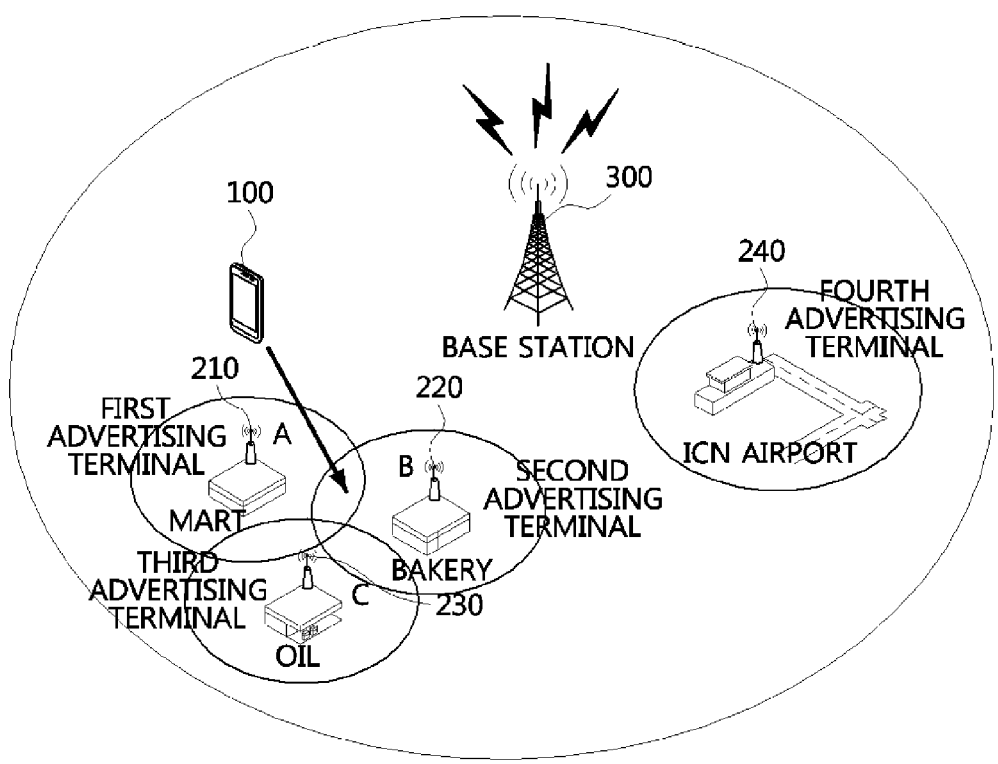
FIG. 1 is a conceptual diagram illustrating an advertising service environment using D2D communication.

Since the present invention may have diverse modified embodiments, preferred embodiments are illustrated in the drawings and are described in the detailed description of the invention.

However, it should be understood that the particular embodiments are not intended to limit the present disclosure to specific forms, but rather the present disclosure is meant to cover all modification, similarities, and alternatives which are included in the spirit and scope of the present disclosure.

Relational terms such as first, second, and the like may be used for describing various elements, but the elements should not be limited by the terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the following description, the technical terms are used only for explaining a specific exemplary embodiment while not limiting the present disclosure. The terms of a singular form may include plural forms unless referred to the contrary. The meaning of 'comprise,' 'include,' or 'have' specifies the presence of stated features, integers, steps, operations, elements, components, and/or groups thereof, but does not preclude the presence or addition of one or more other features, integers, steps, operations, elements, components, and/or groups thereof.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Embodiments of the present invention will be described below in more detail with reference to the accompanying drawings. In describing the invention, to facilitate the entire understanding of the invention, like numbers refer to like elements throughout the description of the figures, and a repetitive description on the same element is not provided.

In the specification, the term "terminal" may be referred to as a user equipment (UE), a mobile station (MS), a user terminal (UT), a wireless terminal, an access terminal (AT), a terminal, a subscriber unit, a subscriber station (SS), a wireless device, a radio communication device, a wireless transmit/receive unit (WTRU), a mobile node, a mobile, or other terms. Various embodiments of the terminal may include a cellular phone, a smartphone having a radio communication function, a personal digital assistant (PDA) having a radio communication function, a wireless modem, a portable computer having a radio communication function, a capturing device such as a digital camera having a radio communication function, a game device having a radio communication function, a music storage and replay appliance having a radio communication function, an Internet appliance enabling wireless Internet access and browsing, and a terminal or a portable unit having a combination of the functions, but the present invention is not limited thereto.

The term "base station" used in the specification may refer to a part that is generally fixed or moves to communicate with terminals, and may collectively include a base station, a node-B, an eNode-B, a base transceiver system, an access point, a transmit point, a receive point, a remote radio head (RRH), a remote radio element (RRE), a remote radio unit (RRU), a relay, a femto cell, etc.

Mobility management entity (MME) performs functions such as non-access signaling (NAS), NAS security, mobility management of a terminal (UE), position relation of an idle-mode UE, roaming relation, authentication, bearer management, etc.

PGW performs functions such as policy enforcement, per-user based packet filtering, charging support, lawful interception, UE IP allocation, packet screening, etc. A home subscriber server (HSS) manages subscriber information and position information of a user.

FIG. 1 is a conceptual diagram illustrating an advertising service environment using D2D communication.

Referring to FIG. 1, a user terminal 100 moves between advertising terminals (D2D coordinators) which are respectively broadcasting advertisements.

The user terminal 100 receives an advertisement from a first advertising terminal 210 in an area A of the first advertising terminal 210 which a mart operates. When the user terminal 100 moves between the area A of the first advertising terminal 210 and an area B of a second advertising terminal 220 which a bakery operates, the user terminal 100 receives an advertisement of the mart and an advertisement of the bakery. That is, the user terminal 100 receives information of an advertising terminal neighboring to a position of the user terminal 100 through D2D communication.

Here, in respective broadcasting areas of advertising terminals 210, 220, 230, and 240, a plurality of advertising terminals may be concentrated and may broadcast advertisements like the first to third advertising terminals 210, 220, and 230, one advertising terminal may broadcast an advertisement alone like the fourth advertising terminal 240, or a combination thereof is possible. Also, a broadcasting area of an advertising terminal may be differently decided according to a provider's policy.

Figure 2:
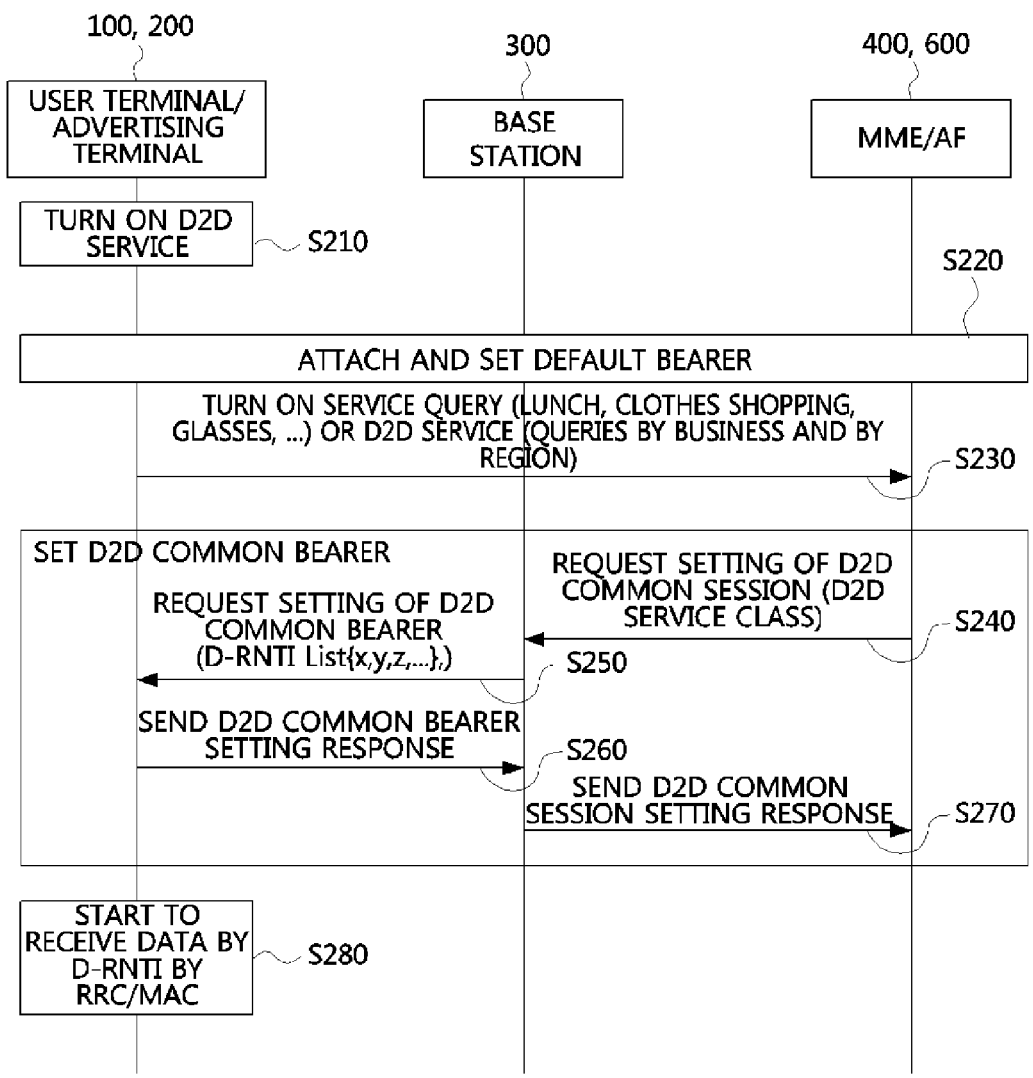
FIG. 2 is a flowchart illustrating a D2D common bearer setting operation according to an embodiment of the present invention.

FIG. 2 is a flowchart illustrating a D2D common bearer setting operation according to an embodiment of the present invention.

The D2D common bearer setting operation of FIG. 2 may be performed by all of the user terminal 100 and the advertising terminals 200, but, in the following description, for convenience of description, the common bearer setting operation of FIG. 2 is assumed as being performed by the user terminal 100.

Referring to FIG. 2, when the user terminal 100 turns on a D2D service for receiving information of a neighboring advertising terminal on the basis of a user input in operation S210, the user terminal 100 shifts to a connection state and generates a default bearer with the existing network in operation S220.

In operation S220, an authentication and authorization procedure of the user terminal 100 may be performed.

Subsequently, the user terminal 100 sends a service query requesting a field interesting to the user or a message indicating a D2D service turn-on state (service activation state) to an MME 400 or an application function (AF) 600 on the basis of the user input in operation S230.

Here, the service query may include, for example, queries by business, queries by region, etc. Here, also the AF 600 may be a D2D server that allows the user terminal 100 and the advertising terminals 200 to D2D communication.

When the service query is received from the user terminal 100 through operation S230, the MME 400 or the AF 600 sets common bearers by service class.

Specifically, the MME 400 or the AF 600 sends a D2D common session setting request message to the base station 300 in operation S240.

The base station 300 sends a D2D common bearer setting request message to the user terminal 100 on the basis of the D2D common session setting request message received through operation S240.

Here, the D2D common bearer may be provided as one or more according to a region, a business, or a provider's policy.

The user terminal 100 sets the D2D common bearer corresponding to the D2D common bearer setting request message which has been received from the base station 300 through operation S250, and sends a D2D common bearer setting response message to the base station 300 in operation S260.

Here, the D2D common bearer setting request message may include identity information (D2D-radio network temporary identity (D-RNTI)) used in the D2D common bearer.

When the D2D common bearer setting response message is received from the user terminal 100, the base station 300 sends a D2D common session setting response message to the MME 400 or the AF 600 in operation S270.

Subsequently, the user terminal 100 receives a plurality of advertising terminal information broadcasted in connection with the D2D common bearer, by using an identity information (D-RNTI) list used in the D2D common bearer in operation S280.

Figure 3:
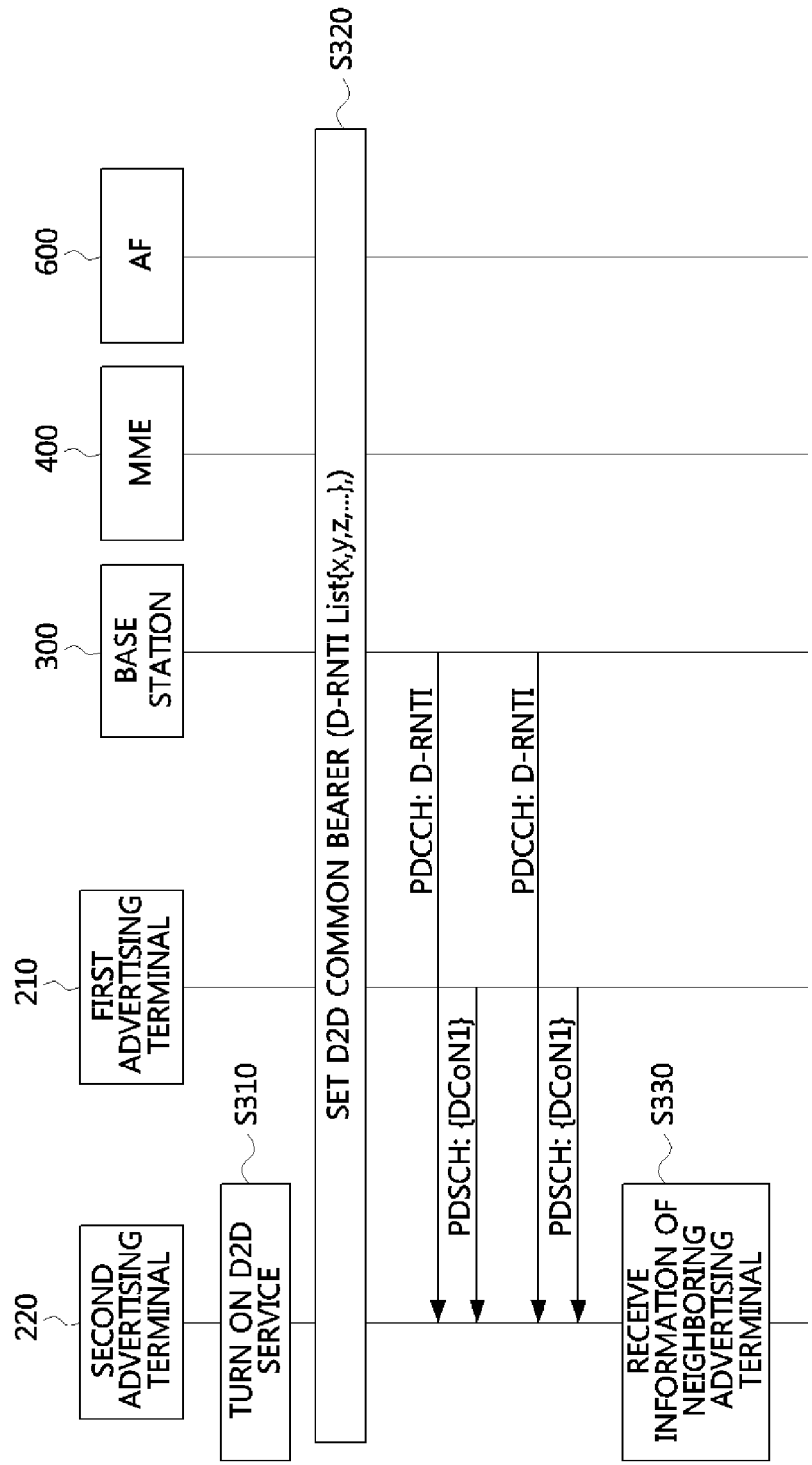
FIG. 3 is a flowchart illustrating an operation of receiving information of an advertising terminal according to an embodiment of the present invention.

FIG. 3 is a flowchart illustrating an operation of receiving information of an advertising terminal according to an embodiment of the present invention.

Referring to FIG. 3, the second advertising terminal 220 turns on the D2D service on the basis of an advertising terminal manager input in operation S310.

Subsequently, the second advertising terminal 220 sets a D2D common bearer with the first advertising terminal 210, the base station 300, the MME 400, and the AF 600 in operation S320.

The second advertising terminal 220 sets the D2D common bearer through operation S320, and receives advertising terminal information transmitted from the first advertising terminal 210 neighboring thereto for a predetermined reception time ($T_{DCon\_Rx}$) to store the advertising terminal information in operation S330.

Here, the advertising terminal information may include, for example, the number of advertising terminals, identity information of each advertising terminal, etc.

Moreover, the predetermined reception time ($T_{DCon\_Rx}$) is a value decided by the base station 300, which may decide the reception time in consideration of a density of neighboring advertising terminals, a moving speed of an advertising target user terminal, etc.

Here, the first advertising terminal 210 transmits data using allocated resources for a predetermined time at every predetermined period.

Moreover, a data link connection identifier (DL-CI), transmitted through a control channel (physical downlink control channel (PDCCH)), for a data channel (physical downlink shared channel (PDSCH)), may be transmitted from a base station, or an advertising terminal may autonomously transmit the data link connection identifier (DL-CI).

Here, a main component transmitting the control channel is decided according to a transmission ability (DL PDCCH transmission ability) of the advertising terminal, a size of a broadcasting area of the advertising terminal, and a provider's policy.

The second advertising terminal 220 may perform operation S330 of receiving ambient information until interesting information is received or a D2D service end is input from an advertising terminal manager.

Figure 4:
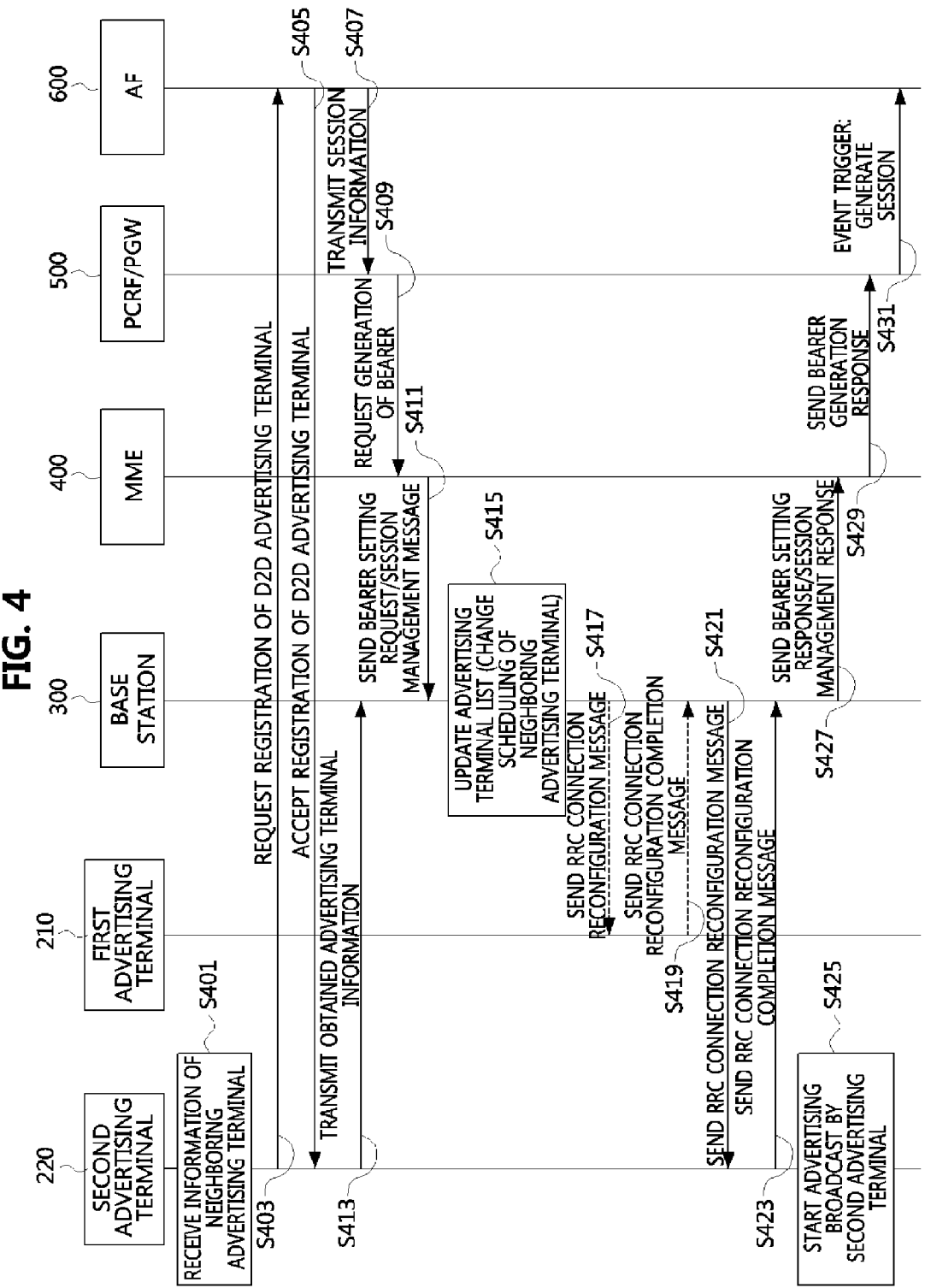
FIG. 4 is a flowchart illustrating an operation of registering an advertising terminal according to an embodiment of the present invention.

FIG. 4 is a flowchart illustrating an operation of registering an advertising terminal according to an embodiment of the present invention.

Referring to FIG. 4, as described above with reference to FIG. 3, the second advertising terminal 220 sets a common bearer and receives first advertising terminal information for the predetermined reception time ($T_{DCon\_Rx}$) in operation S401.

Subsequently, the second advertising terminal 220 sends a D2D advertising terminal registration request message for operating as a D2D advertising terminal to the AF 600 of a network in operation S403.

The AF 600 of the network determines whether to accept a registration of the D2D advertising terminal through a PCRF/PGW 500 according to the D2D advertising terminal registration request message received through operation S403, and when the AF 600 accepts the D2D advertising terminal registration request, the AF 600 sends a D2D advertising terminal registration acceptance message to the second advertising terminal 220 in operation S405.

Here, the D2D advertising terminal registration acceptance message may include D2D service identity information (for example, peer identity information) of an allocated advertising terminal.

Subsequently, the AF 600 transmits session information including the D2D service identity information of the allocated advertising terminal to the PCRF/PGW 500 in operation S407. The PCRF/PGW 500 sends a bearer generation request (Connect Bearer Req) message to the MME 400 on the basis of the received session information in operation S409.

In operation S411, the MME 400 sends a bearer setting request message or a session management message to the base station 300 on the basis of the bearer generation request message sent through operation S409.

When the D2D advertising terminal registration acceptance message is received from the AF 600 through operation S405, the second advertising terminal 220 transmits stored information of a neighboring advertising terminal to the base station 300 in operation S413.

Here, the pre-stored information of the neighboring advertising terminal may be used when the base station 300 schedules a D2D common bearer. Also, operation S413 may inform a radio resource control (RRC) of a start of an operation of an advertising terminal through a user interface.

In operation S415, the base station 300 updates an advertising terminal list for correcting an operation scheme of the existing advertising terminal, on the basis of the bearer setting request message or session management message received through operation S411 and the information of the neighboring advertising terminal received through operation S413.

Here, the operation scheme of the existing advertising terminal may include scheduling, a distribution position, etc. Also, when the second advertising terminal 220 does not affect an operation scheme of the first advertising terminal 210 despite the existing D2D common bearer being used in common, the base station 300 may allow the existing D2D common bearer to be used in common on the basis of the received bearer setting request message or session management message and the received neighboring advertising terminal information.

Subsequently, the base station 300 sends an RRC connection reconfiguration message to the first advertising terminal 210 in operation S417.

Here, the RRC connection reconfiguration message may include an advertisement transmission period, D2D common bearer setting information, etc.

The first advertising terminal 210 reconfigures the D2D common bearer on the basis of the RRC connection reconfiguration message received through operation S417, and sends an RRC connection reconfiguration completion message to the base station 300 in operation S419.

At this time, when it is not required to correct the operation scheme of the first advertising terminal 210, relevant operations S417 and S419 may not be performed.

The base station 300 sends the RRC connection reconfiguration message to the second advertising terminal 220 in operation S421.

The second advertising terminal 220 sets a D2D common bearer on the basis of the RRC connection reconfiguration message received through operation S421, and sends the RRC connection reconfiguration completion message to the base station 300 in operation S423.

Subsequently, the second advertising terminal 220 transmits an advertising broadcast to at least one other advertising terminal and the user terminal through the set common bearer in operation S425.

Here, the advertising broadcast may be configured with data of a specific size according to a time period and a resource which are allocated by the base station 300, and may be transmitted periodically. Also, advertising contents may be changed by an input of a manager of the second advertising terminal 220, and the changed advertising contents cannot exceed a resource allocated by the base station 300. A size of the advertising contents using the common bearer may be decided according to a discussion with a provider.

When the RRC connection reconfiguration completion message is received through operations S419 and S423, the base station 300 sends a bearer setting response or a session management response to the MME 400 in operation S427.

The MME 400 sends a bearer generation response to the PCRF/PGW 500 on the basis of the received bearer setting response or session management response in operation S429.

When the bearer generation response is received through operation S429, the PCRF/PGW 500 sends a session generation response message to the AF 600 in operation S431.

Accordingly, in the advertising service method using D2D communication according to an embodiment of the present invention, an operation of avoiding a collision between advertising terminals which are located in plurality in a specific area and transmit advertisements and a resource sharing operation are provided, thus enabling limited radio resources and control channel resources to be efficiently used.

Figure 5:
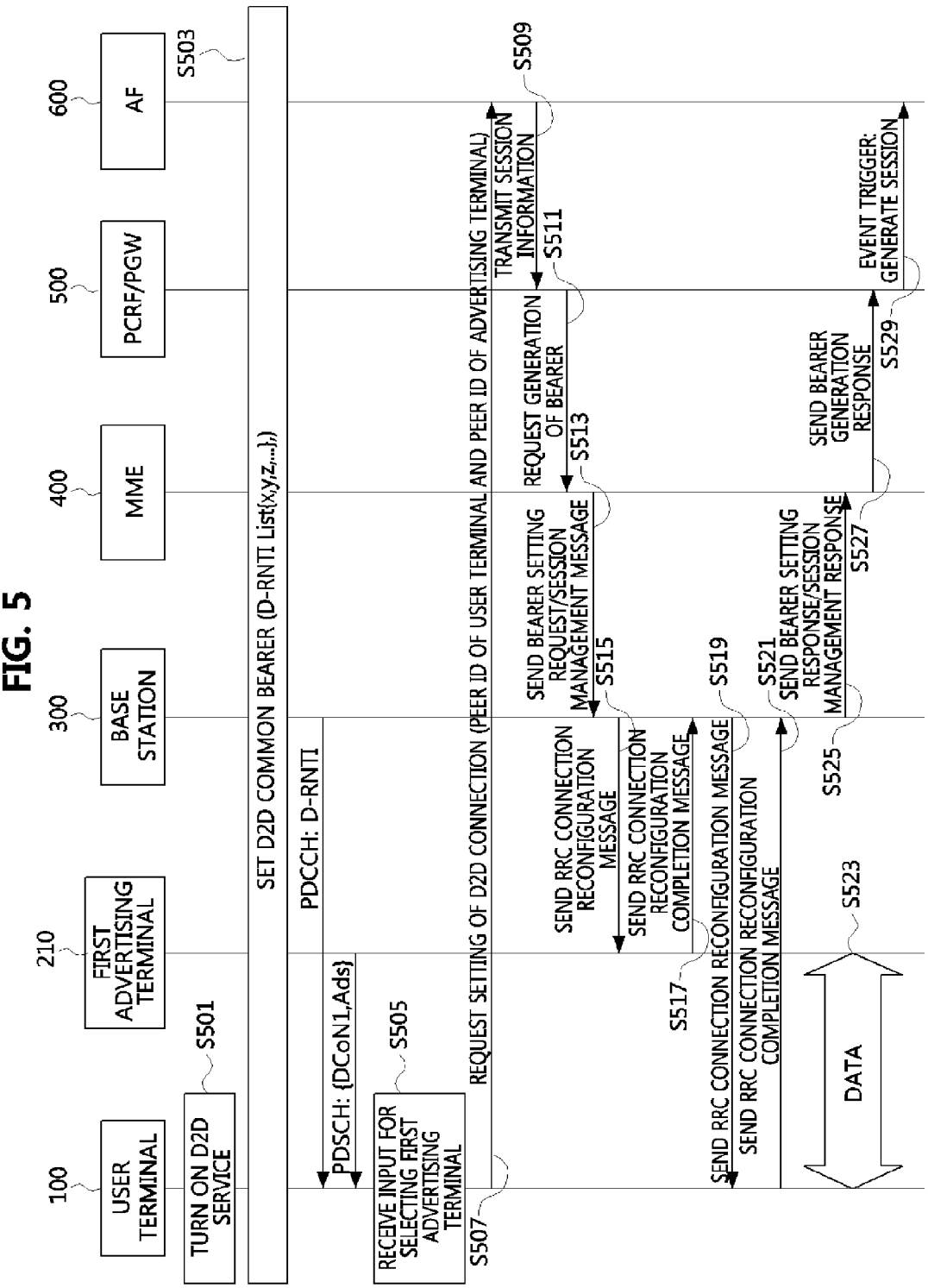
FIG. 5 is a flowchart illustrating an operation of connecting D2D communication between an advertising terminal and a user terminal according to an embodiment of the present invention.

FIG. 5 is a flowchart illustrating an operation of connecting D2D communication between an advertising terminal and a user terminal according to an embodiment of the present invention.

Referring to FIG. 5, the user terminal 100 turns on the D2D service on the basis of a user input in operation S501.

Subsequently, the user terminal 100 completes setting of a D2D common bearer with the network, and receives advertising terminal information and advertisements from neighboring advertising terminals through the D2D common bearer in operation S503.

The user terminal 100 receives a user input for selecting the first advertising terminal 210 from among the received various pieces of advertising terminal information and advertisements in operation S505, and sends a D2D connection setting request message for connecting with the selected first advertising terminal 210 to the AF 600 in operation S507.

Here, the D2D connection setting request may include peer identity information of the user terminal 100 and peer identity information of the first advertising terminal 210.

When the D2D connection setting request message for connecting with the first advertising terminal 210 is received from the user terminal 100, the AF 600 transmits session information for a D2D connection between the first advertising terminal 210 and the user terminal 100 to the PCRF/PGW 500 in operation S509.

The PCRF/PGW 500 sends a bearer generation request message to the MME 400 on the basis of the session information received from the AF 600 in operation S511.

The MME 400 sends a bearer setting request message or a session management request message to the base station 300 on the basis of the bearer generation request message received from the PCRF/PGW 500 in operation S513.

In operation S515, the base station 300 sends an RRC connection reconfiguration message to the first advertising terminal 210 on the basis of the bearer setting request message or session management request message received through operation S513.

Here, the RRC connection reconfiguration message may include D2D dedicated bearer setting information and peer identity information of the user terminal 100.

The first advertising terminal 210 sets a D2D dedicated bearer with the user terminal 100 corresponding to the RRC connection reconfiguration message received through operation S515, and sends an RRC connection reconfiguration completion message to the base station 300 in operation S517.

In operation S519, the base station 300 sends the RRC connection reconfiguration message to the user terminal 100 on the basis of the bearer setting request message or session management request message received through operation S513.

Here, the RRC connection reconfiguration message may include the D2D dedicated bearer setting information and the peer identity information of the first advertising terminal 210.

The user terminal 100 sets the D2D dedicated bearer with the first advertising terminal 210 corresponding to the RRC connection reconfiguration message received through operation S519, and sends an RRC connection reconfiguration completion message to the base station 300 in operation S521.

Subsequently, the user terminal 100 and the first advertising terminal 210 transmit and receive data through the D2D dedicated bearer in operation S523.

When the RRC connection reconfiguration completion message is received through operations S517 and S521, the base station 300 sends a bearer setting response message or a session management response message to the MME 400 in response to the bearer setting request message or session management request message received through operation S513, in operation S525.

When the bearer setting response message or session management response message is received, the MME 400 sends a bearer generation response message to the PCRF/PGW 500 in response to the bearer generation request of operation S511, in operation S527.

When the bearer generation response message is received, the PCRF/PGW 500 sends a session generation completion message to the AF 600 in operation S529.

Accordingly, in the advertising service method using D2D communication according to an embodiment of the present invention, an operation of establishing a call with a neighboring terminal can be simplified, and it is possible to transmit and receive data based on proximity without setting a relation between terminals.

Figure 6:
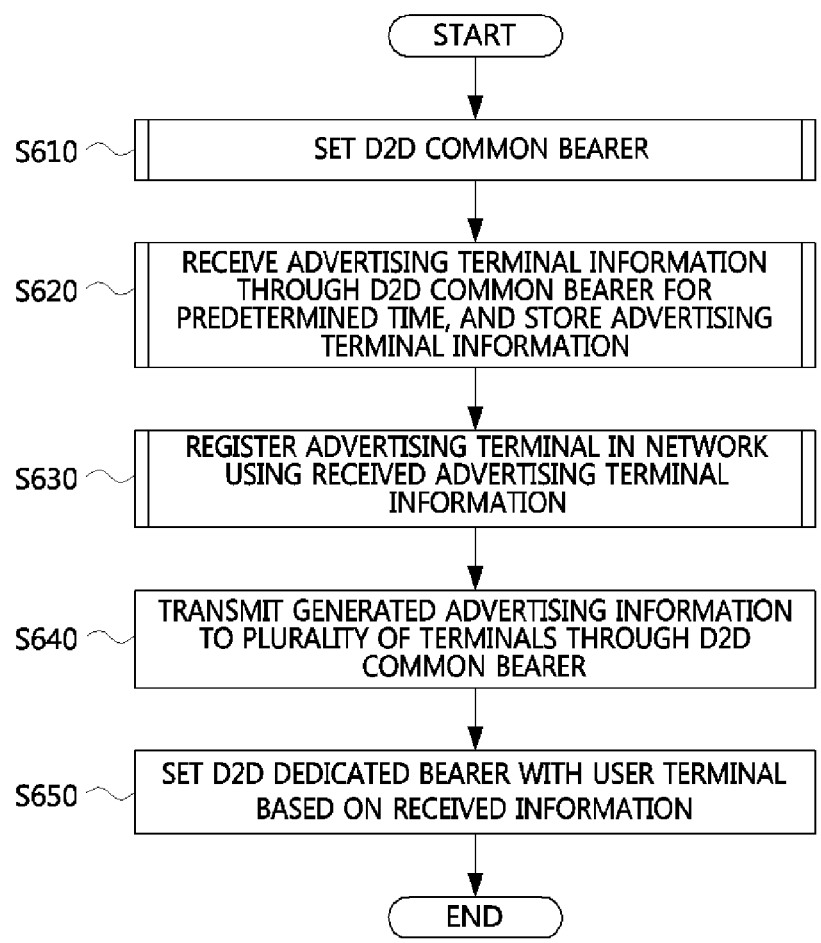
FIG. 6 is a flowchart illustrating an advertising service method using D2D communication which is performed by an advertising terminal according to an embodiment of the present invention.

FIG. 6 is a flowchart illustrating an advertising service method using D2D communication which is performed by an advertising terminal according to an embodiment of the present invention.

Referring to FIG. 6, the advertising terminal 200 sets a D2D common bearer over the network in operation S610.

Subsequently, the advertising terminal 200 receives advertising terminal information from other advertising terminal neighboring thereto through the D2D common bearer for a predetermined time, and stores the received advertising terminal information in operation S620.

Here, the predetermined time may be decided on the basis of at least one of a density of neighboring advertising terminals and a moving speed of a user terminal. Also, the advertising terminal information may include the number of neighboring advertising terminals, identity information of each advertising terminal, etc.

Subsequently, the advertising terminal 200 registers in the network in operation S630.

When the advertising terminal 200 is registered as an advertising terminal through operation S630, the advertising terminal 200 periodically transmits generated advertising information to a plurality of terminals neighboring thereto through the D2D common bearer in operation S640.

Here, the generated advertising information may be generated on the basis of a time period and a resource which are allocated by the network.

Subsequently, the advertising terminal 200 selected by the user terminal 100 sets a D2D dedicated bearer with the user terminal 100 on the basis of user terminal identity information and D2D dedicated bearer setting information which are received from the network, in operation S650.

Hereinafter, an operation performed by an advertising terminal will be described in detail with reference to FIGS. 7 to 9.

Figure 7:
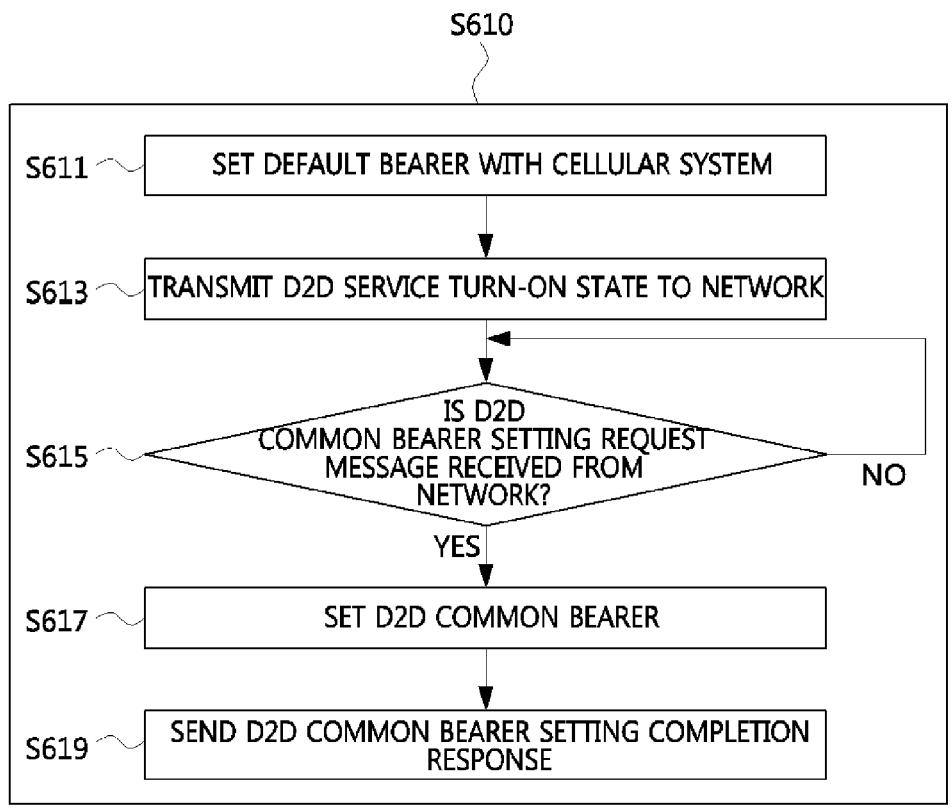
FIG. 7 is a flowchart specifically illustrating a common bearer setting operation in the advertising service method of FIG. 6.

FIG. 7 is a flowchart specifically illustrating a common bearer setting operation in the advertising service method of FIG. 6.

Referring to FIG. 7, the advertising terminal 200 sets a default bearer with the existing network when a service is turned on according to a manager input, in operation S611.

The advertising terminal 200 sends a message, indicating a service turn-on (service activation) state, to the network through the set default bearer in operation S613.

Subsequently, the advertising terminal 200 determines whether a D2D common bearer setting request message is received from the network in operation S615.

When the D2D common bearer setting request message is received from the network through operation S615, the advertising terminal 200 sets a D2D common bearer with the network on the basis of the received D2D common bearer setting request message in operation S617.

Subsequently, the advertising terminal 200 sends a D2D common bearer setting completion response message to the network in operation S619.

Figure 8:
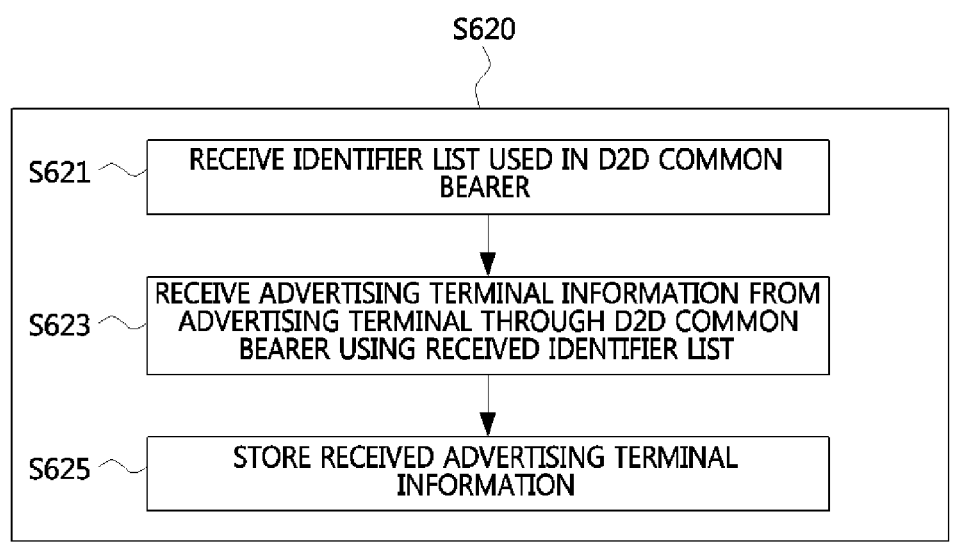
FIG. 8 is a flowchart specifically illustrating an advertising terminal information receiving operation in the advertising service method of FIG. 6.

FIG. 8 is a flowchart specifically illustrating an advertising terminal information receiving operation in the advertising service method of FIG. 6.

Referring to FIG. 8, the advertising terminal 200 receives an identity information list using the D2D common bearer from the network in operation S621.

In operation S623, the advertising terminal 200 receives advertising terminal information from an advertising terminal neighboring thereto through the D2D common bearer using the identity information list received through operation S621.

Subsequently, the advertising terminal 200 stores the advertising terminal information received through operation S623, in operation S625.

FIG. 9 is a flowchart specifically illustrating an advertising terminal registering operation in the advertising service method of FIG. 6.

Referring to FIG. 9, the advertising terminal 200 sends an advertising terminal registration request message to the network in operation S631.

Subsequently, the advertising terminal 200 determines whether an advertising terminal registration acceptance message is received from the network in operation S633.

When the advertising terminal registration acceptance message is received through operation S633, the advertising terminal 200 obtains stored information of a neighboring advertising terminal, and transmits the obtained advertising terminal information to the network in operation S635.

Here, the stored information of the neighboring advertising terminal may be used when the base station 300 schedules the D2D common bearer. Also, operation S635 may inform the RRC of a start of an operation of an advertising terminal through the user interface.

Subsequently, the advertising terminal 200 determines whether D2D common bearer resetting information is received from the network in operation S637.

When the D2D common bearer resetting information is received through operation S637, the advertising terminal 200 resets a D2D common bearer on the basis of the D2D common bearer resetting information in operation S639.

Subsequently, the advertising terminal 200 transmits its own advertising information to terminals neighboring thereto using the D2D common bearer.

FIG. 10 is a flowchart illustrating an advertising service method using D2D communication which is performed by a user terminal according to an embodiment of the present invention.

Referring to FIG. 10, the user terminal 100 sets a D2D common bearer with the network in operation S1010.

Subsequently, the user terminal 100 receives advertising terminal information from a plurality of advertising terminals through the D2D common bearer for a predetermined time in operation S1020.

Here, the predetermined time may be decided on the basis of at least one of a density of neighboring advertising terminals and a moving speed of a user terminal.

When the advertising terminal information is received from the plurality of advertising terminals through operation S1020, the user terminal 100 sets a D2D dedicated bearer with an advertising terminal selected from among the plurality of advertising terminals on the basis of a user input signal in operation S1030.

Here, the advertising terminal information may include the number of advertising terminals, identity information of each advertising terminal, etc.

Subsequently, the user terminal 100 transmits and receives data to and from the selected advertising terminal through the set D2D dedicated bearer in operation S1040.

Accordingly, in the advertising service method using D2D communication according to an embodiment of the present invention, an operation of establishing a call with a neighboring terminal can be simplified, and it is possible to transmit and receive data based on proximity without setting a relation between terminals.

Hereinafter, an operation performed by a user terminal will be described in detail with reference to FIGS. 11 to 13.

FIG. 11 is a flowchart specifically illustrating a common bearer setting operation in the advertising service method of FIG. 10.

Referring to FIG. 11, in operation S1011, the user terminal 100 sets a default bearer with the existing network when a service is turned on, on the basis of a user input.

The user terminal 100 determines whether information interesting to the user is input in operation S1012, and, when the information interesting to the user is input, the user terminal 100 transmits the input information interesting to the user to the network through the default bearer in operation S1013.

Here, the information interesting to the user may include, for example, lunch, clothes shopping, glasses, movie, etc.

Subsequently, the user terminal 100 determines whether a D2D common bearer setting request message is received from the network in operation S1014, and when the D2D common bearer setting request message is received, the user terminal 100 sets a D2D common bearer with the network in operation S1015.

The user terminal 100 sets a D2D common bearer through operation S1015, and sends a D2D common bearer setting completion response to the network in operation S1016.

FIG. 12 is a flowchart specifically illustrating an operation that receives advertising terminal information through a D2D common bearer in the advertising service method of FIG. 10.

Referring to FIG. 12, the user terminal 100 receives an identity information (D-RNTI) list, used in the D2D common bearer, from the network in operation S1021.

Subsequently, the user terminal 100 receives advertising terminal information and an advertisement from at least one advertising terminal through the D2D common bearer using the received identity information list in operation S1023.

Figure 13:
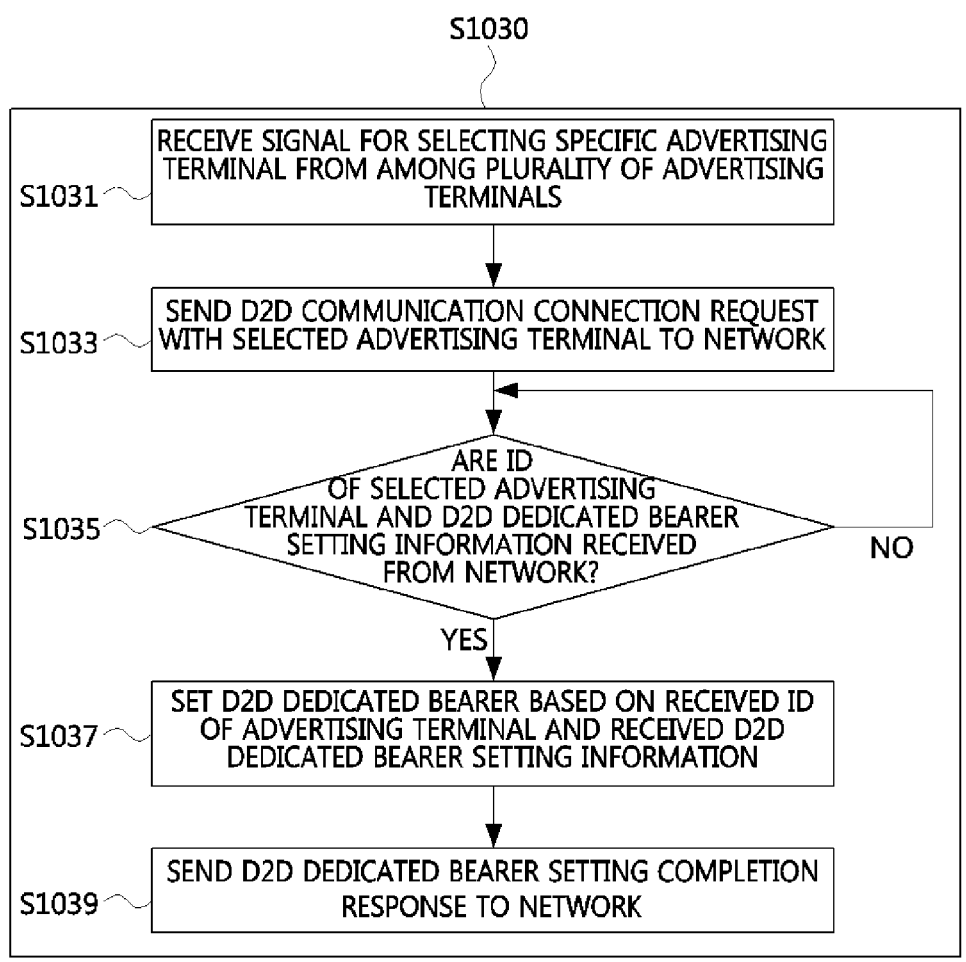
FIG. 13 is a flowchart specifically illustrating an operation that sets a selected advertising terminal and a D2D dedicated bearer in the advertising service method of FIG. 10.

FIG. 13 is a flowchart specifically illustrating an operation that sets a selected advertising terminal and a D2D dedicated bearer in the advertising service method of FIG. 10.

Referring to FIG. 13, the user terminal 100 selects a specific advertising terminal from among a plurality of advertising terminals according to a user input in operation S1031.

The user terminal 100 sends a D2D communication connection request message with the advertising terminal, selected through operation S1031, to the network in operation S1033.

Here, the D2D communication connection request message with the selected advertising terminal may include identity information of the selected advertising terminal and identity information of the user terminal 100.

Subsequently, the user terminal 100 determines whether the identity information of the selected advertising terminal and setting information of a D2D dedicated bearer from the network in operation S1035.

When the identity information of the selected advertising terminal and the setting information of the D2D dedicated bearer are received through operation S1035, the user terminal 100 sets a D2D dedicated bearer on the basis of the received identity information of the advertising terminal and the received setting information of the D2D dedicated bearer in operation S1037.

The user terminal 100 sets the D2D dedicated bearer, and sends a D2D dedicated bearer setting completion response message to the network in operation S1039.

Subsequently, the user terminal 100 performs D2D communication with the advertising terminal using the set D2D dedicated bearer.

Accordingly, in the advertising service method using D2D communication according to an embodiment of the present invention, an operation of establishing a call with a neighboring terminal can be simplified, and it is possible to transmit and receive data based on proximity without setting a relation between terminals.

In an embodiment of the present invention, the above description has been made under the assumption that an advertising terminal registration and a D2D-related function are added to a core network, and when the advertising terminal registration and the D2D-related function are added to the base station, a D2D service start, an advertising terminal registration request, and a D2D connection setting request with an advertising terminal may be transmitted to and processed by the base station without being transmitted to the AF.

In the advertising service method using D2D communication according to an embodiment of the present invention, a message indicating a D2D service activation state is transmitted to a network so as to set a D2D common bearer, an advertising terminal is registered in the network so as to reset the D2D common bearer, a D2D dedicated bearer for direct communication with a user terminal is set to transmit an advertisement to the user terminal, and a feedback of the transmitted advertisement is received.

Accordingly, an advertisement can be easily transmitted to a plurality of user terminals which were not previously connected, and a collision between advertising terminals which are located in plurality in a specific area and transmit advertisements can be avoided. Also, limited radio resources and control channel resources can be efficiently used by providing the resource sharing operation.

While the example embodiments of the present invention and their advantages have been described in detail, it should be understood that various changes, substitutions, and alterations may be made herein without departing from the scope of the invention.

What is claimed is:

1. An advertising service method using device-to-device (D2D) communication in a first advertising terminal, the advertising service method comprising:
setting, by a processor in the first advertising terminal, a D2D common bearer with a network, wherein the D2D common bearer is used for transmission and reception of advertising information of a plurality of advertising terminals which provide the advertising service;
receiving, by a radio communication device in the first advertising terminal, the advertising information from the plurality of advertising terminals through the D2D common bearer;
registering, by the processor in the first advertising terminal, the first advertising terminal in the network;
transmitting, by the radio communication device in the first advertising terminal, advertising information of the first advertising terminal to the other advertising terminals and a user terminal through the D2D common bearer, wherein the user terminal is an electronic device; and
setting, by the processor in the first advertising terminal, a D2D dedicated bearer between the user terminal and the first advertising terminal on the basis of information received from the network,
wherein the D2D dedicated bearer is used for transmission and reception of data between the user terminal and the first advertising terminal.

2. The advertising service method of claim 1, wherein the setting of the D2D common bearer with the network comprises:
setting a default bearer with the network;
sending a message, indicating a D2D service activation state, to the network;
setting the D2D common bearer corresponding to a D2D common bearer setting request message received from the network; and
sending a D2D common bearer setting completion response message to the network.

3. The advertising service method of claim 1, wherein the receiving of the advertising information from the plurality of advertising terminals through the D2D common bearer comprises:
receiving an identity information list using the D2D common bearer from the network;
receiving advertising information from other advertising terminals through the D2D common bearer using the received identity information list; and
storing the received advertising information.

4. The advertising service method of claim 1, wherein the receiving of the advertising information from the plurality of advertising terminals through the D2D common bearer is performed for a predetermined time on the basis of at least one of a density of other advertising terminals and a moving speed of the user terminal.

5. The advertising service method of claim 1, wherein the advertising information comprises at least one of number of neighboring advertising terminals and identity information of the neighboring advertising terminals.

6. The advertising service method of claim 1, wherein the registering of the first advertising terminal in the network comprises:
 sending a message for requesting a registration of the first advertising terminal to the network:
 when an advertising terminal registration acceptance message is received from the network, transmitting the advertising terminal information to the network; and
 when D2D common bearer resetting information is received from the network, resetting the D2D common bearer on the basis of the received D2D common bearer resetting information.

7. The advertising service method of claim 6, wherein the advertising terminal registration acceptance message comprises peer identity information.

8. The advertising service method of claim 1, wherein the transmitting of the advertising information to the other advertising terminals through the D2D common bearer comprises generating advertising information in a specific size on the basis of a time period and a resource which are allocated by the network, and transmitting the generated advertising information to the other advertising terminals through the D2D common bearer.

9. The advertising service method of claim 1, wherein the information received from the network comprises identity information of a user terminal intending to set the D2D dedicated bearer and setting information of the D2D dedicated bearer.

10. An advertising service method using device-to-device (D2D) communication in a user terminal, the advertising service method comprising:
 setting, by a processor in the user terminal, a D2D common bearer with a network, wherein the D2D common bearer is used for transmission and reception of advertising information of a plurality of advertising terminals;
 receiving, by a radio communication device in the user terminal, advertising information from the plurality of advertising terminals through the D2D common bearer;
 setting, by the processor in the user terminal, a D2D dedicated bearer between the user terminal and a first advertising terminal that has transmitted specific advertising information among the plurality of advertising terminals, wherein the D2D dedicated bearer is used for transmission and reception of data between the user terminal and the first advertising terminal; and
 transmitting and receiving data to and from the first advertising terminal that has set the D2D dedicated bearer.

11. The advertising service method of claim 10, wherein the receiving of the advertising information from the plurality of advertising terminals through the D2D common bearer is performed for a predetermined time on the basis of at least one of a density of neighboring advertising terminals and a moving speed of the user terminal.

12. The advertising service method of claim 10, wherein the advertising information comprises at least one of number of neighboring advertising terminals and identity information of the neighboring advertising terminals.

13. The advertising service method of claim 10, wherein the setting of the D2D common bearer with the network comprises:
 setting a default bearer with the network;
 transmitting input information interesting to a user to the network;
 when a D2D common bearer setting request message is received from the network, setting the D2D common bearer; and
 sending a D2D common bearer setting completion response message to the network.

14. The advertising service method of claim 10, wherein the receiving of the advertising information from the plurality of advertising terminals through the D2D common bearer comprises:
 receiving an identity information list using the D2D common bearer from the network; and
 receiving advertising information and advertisements from the plurality of advertising terminals through the D2D common bearer using the received identity information list.

15. The advertising service method of claim 10, wherein the setting of the D2D dedicated bearer between the user terminal and the first advertising terminal that has transmitted specific advertising information among the plurality of advertising terminals comprises:
 selecting specific advertising information from among information of the plurality of advertising terminals on the basis of a user input;
 sending a D2D communication connection request message with the first advertising terminal, which has transmitted the specific advertising information, to the network;
 when identity information of the first advertising terminal and setting information of a D2D dedicated bearer are received from the network, setting the D2D dedicated bearer on the basis of the received identity information of the advertising terminal and the setting information of the D2D dedicated bearer; and
 sending a D2D dedicated bearer setting completion response message to the network.

16. The advertising service method of claim 15, wherein the D2D communication connection request message with the first advertising terminal, which has transmitted the specific advertising information, comprises identity information of the first advertising terminal and identity information of the user terminal.

\* \* \* \* \*